United States Patent [19]

Lux et al.

[11] 4,442,334

[45] Apr. 10, 1984

[54] DEVICE FOR FEEDING WELDING WIRE IN A SUBMERGED ARC WELDING OPERATION

[75] Inventors: Werner Lux, Oberhausen; Jürgen Vahlensieck, Bonn; Jakob Zell, Oberhausen; Bodo Hermann; Heinz Bartsch, both of Bottrop; Horst Zimmermann, Oberhausen, all of Fed. Rep. of Germany

[73] Assignee: M.A.N. Maschinenfabrik Augsburg-Nürnberg Aktiengesellschaft, Fed. Rep. of Germany

[21] Appl. No.: 334,072

[22] Filed: Dec. 23, 1981

[30] Foreign Application Priority Data

Dec. 24, 1980 [DE] Fed. Rep. of Germany ....... 3049118

[51] Int. Cl.$^3$ .............................................. B23K 9/18
[52] U.S. Cl. .................................... 219/73; 219/136; 219/137.2
[58] Field of Search ................ 219/136, 137 R, 137.2, 219/155, 73; 72/162; 140/147

[56] References Cited

U.S. PATENT DOCUMENTS

| 2,069,623 | 2/1937 | Pickhaver . | |
|---|---|---|---|
| 3,543,810 | 12/1970 | Scheller | 140/147 |
| 3,963,895 | 6/1976 | Hennion | 219/136 X |
| 4,219,717 | 8/1980 | Kuhnen | 219/73 X |
| 4,289,950 | 9/1981 | Griebeler | 219/124.34 |
| 4,335,758 | 6/1982 | Williams | 140/147 X |

FOREIGN PATENT DOCUMENTS 749439  7/1933  France .

Primary Examiner—Volodymyr Y. Mayewsky
Assistant Examiner—Catherine M. Sigda
Attorney, Agent, or Firm—McGlew and Tuttle

[57] ABSTRACT

A device for feeding welding wire in a submerged arc welding operation in which there is a narrow gap between workpieces which are to be welded together comprises a guide support having a plurality of spaced apart welding wire straightening roller assemblies mounted thereon which are in a position at selected angles relative to each other around and in engagement with the welding wire and which define a feed guide path for the passage of the welding wire between the rollers of each assembly. A welding head is pivotally mounted on a support for pivotal movement transverse to the welding direction and the head includes a welding guide and a carrying guide which together define tongs of the head which are mounted on the support for pivotal movement toward and away from each other. Tongs carry a plurality of guide shoes which define a continuing guide path for the welding wire received from the welding wire feed guide and deliver it to the welding zone between the workpieces. A contact piece associated with the current carrying guide provided current for the welding operation. Means are provided for biasing the current guide toward the welding wire guide. The construction preferably includes at least three straightening roller assemblies with at least three roller assembly elements which are rotatable relative to each other in a direction around the periphery of the wire which they cooperate to guide and straighten. The welding head advantageously includes welding guide blade and a current carrying guide blade which are pivotally mounted on a hinge bolt. Straightening roller units are carried in a cylindrical roller housing on the support. Each of the roller housings comprises a substantially tubular shell which is designed with an upper inside recess and with a lower centering extension to be snugly fitted into the recess of each following roller housing. The extension is provided with an outer circular groove and can be clamped in position by means of fixing screws.

20 Claims, 13 Drawing Figures

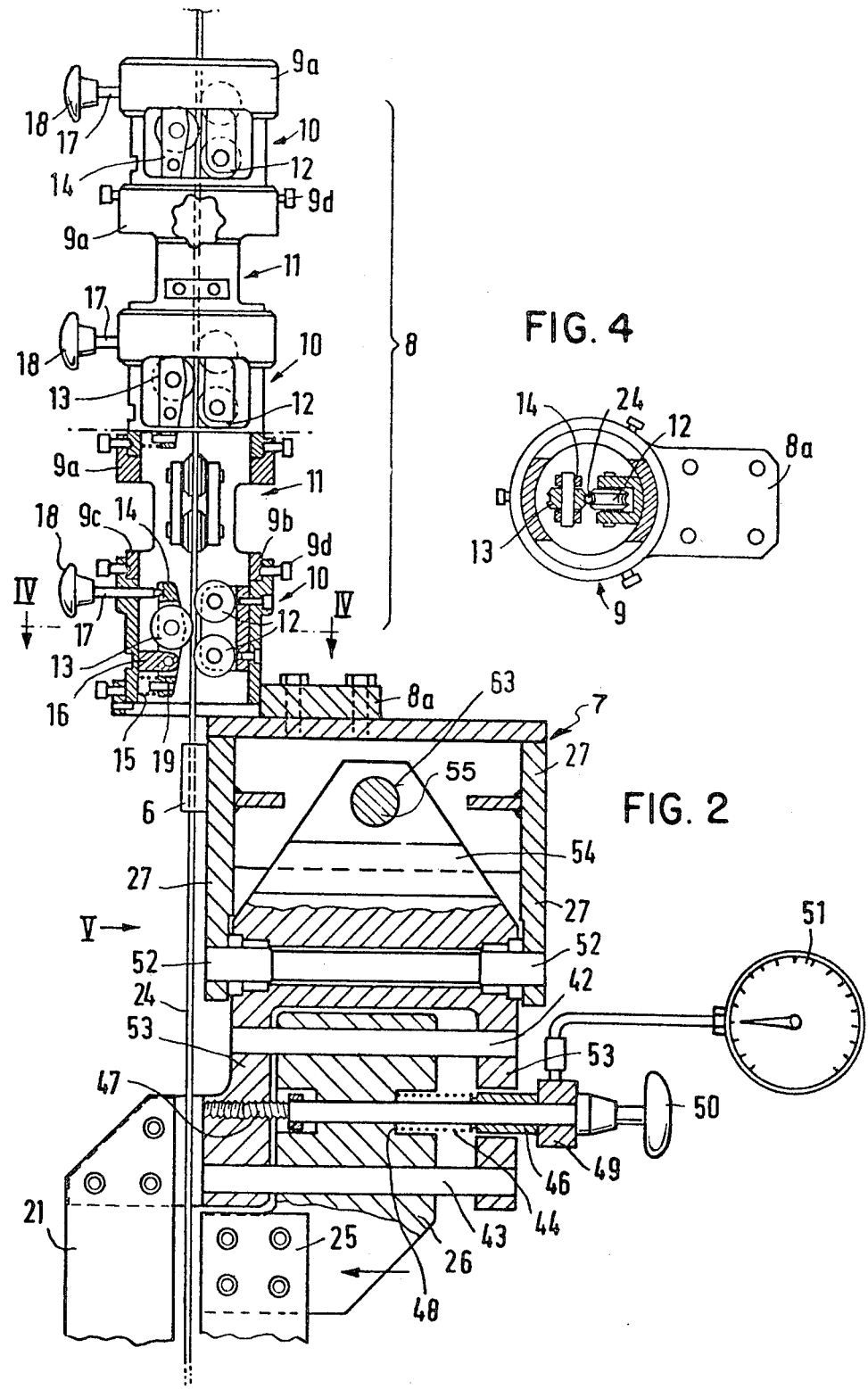

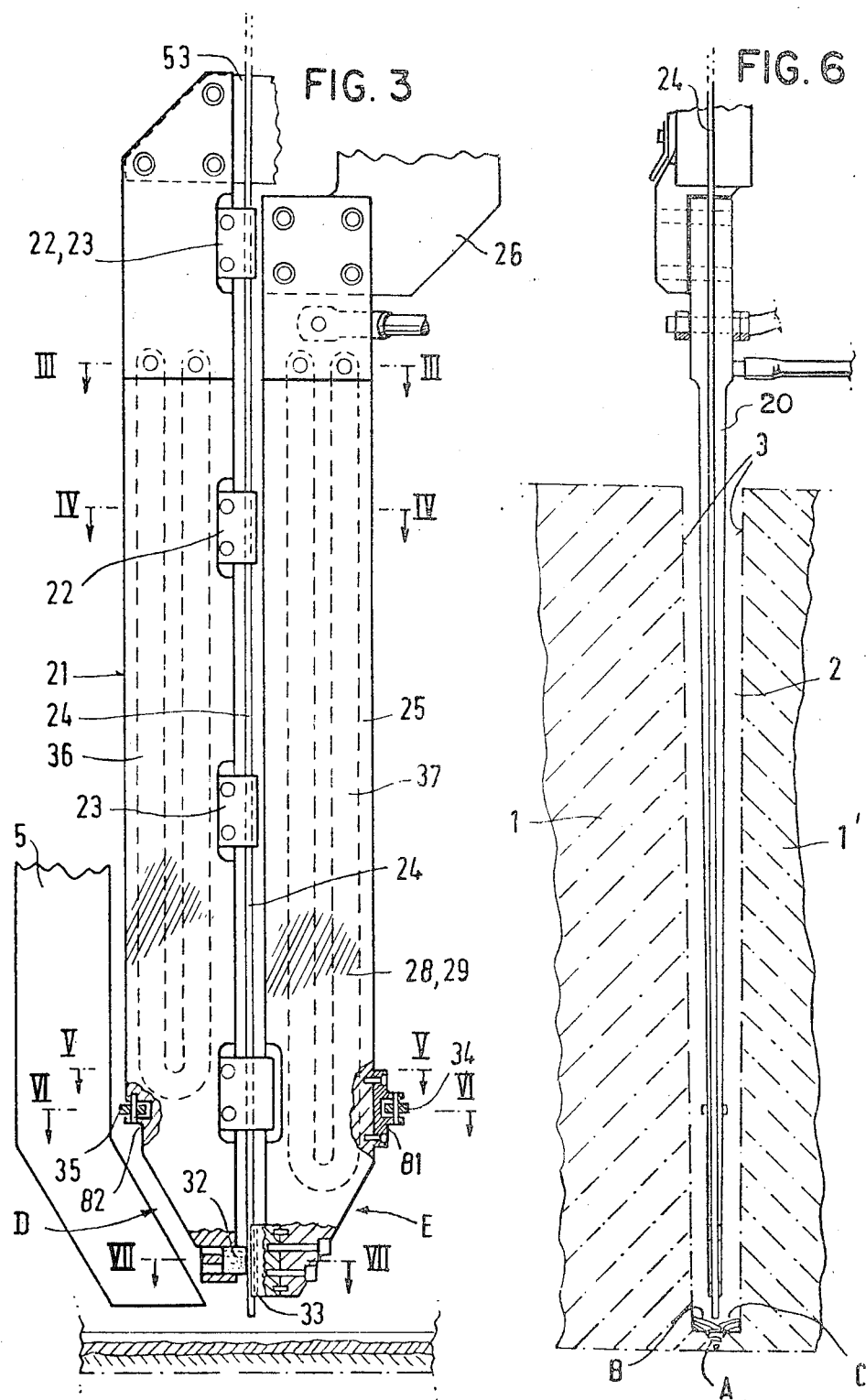

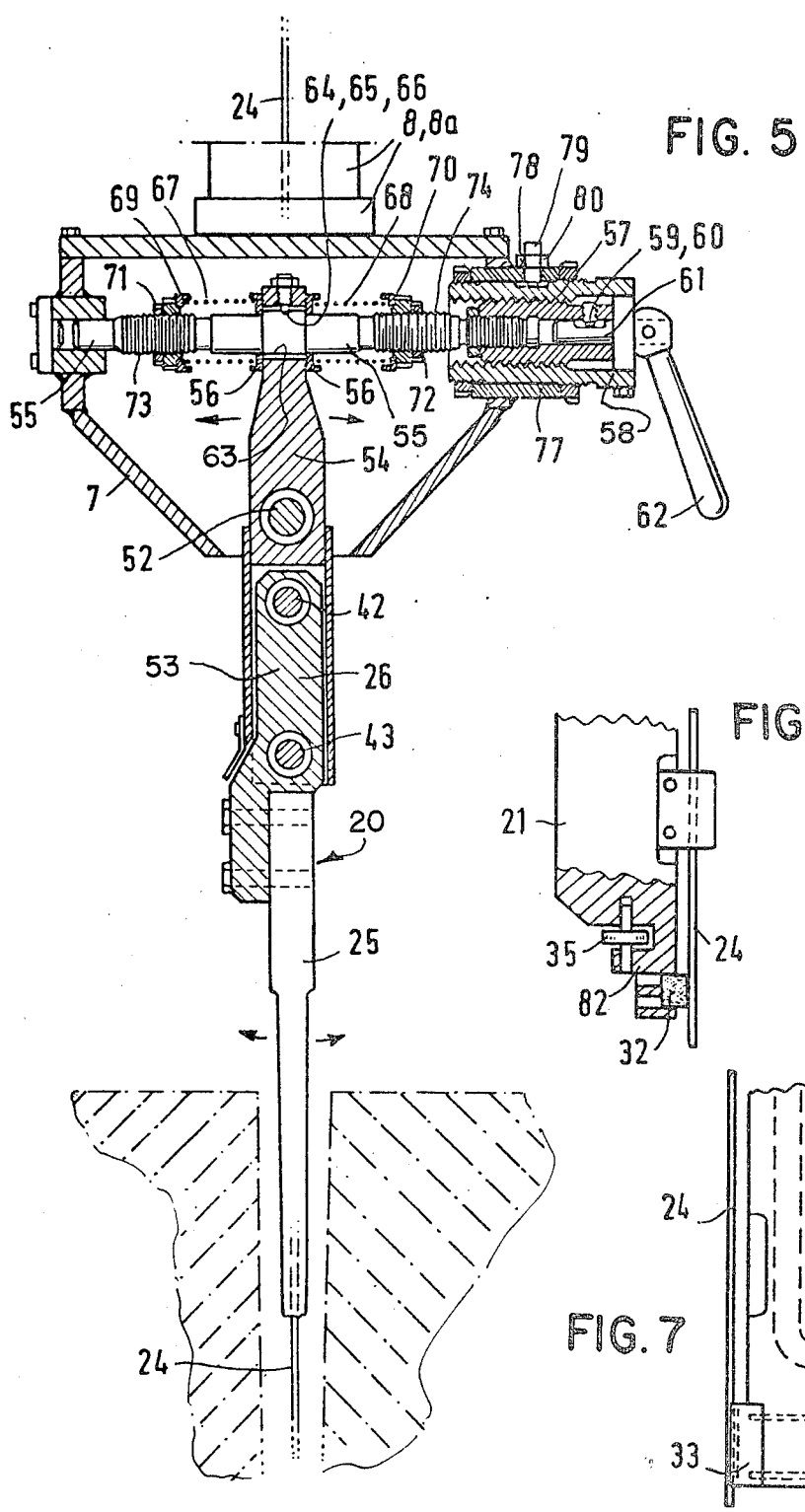

DEVICE FOR FEEDING WELDING WIRE IN A SUBMERGED ARC WELDING OPERATION

FIELD AND BACKGROUND OF THE INVENTION

This invention relates in general to welding devices and in particular to a new and useful device for feeding the welding wire in a submerged arc welding operation and which includes a support carrying a straightening roller assembly in a position to cooperate with the feeding and straightening of welding wire into association with the welding head comprising tongs formed by a pivotal guide blade and a current carrying blade which are positioned relative to the straightening rollers so as to advance the wire set by the straightening rollers into association with the welding gap formed between workpieces.

The invention relates in particular to a device for feeding the welding wire in submerged arc welding operations in which narrow gap-type joints are to be welded, such as disclosed in German utility model No. 7623758 or German Os No. 26 33 829 (U.S. Pat. No. 4,219,717 to Kuhnan). This device substantially comprises a welding head which is pivotable within a certain angle about an axis which is perpendicular to the welding direction, and is equipped with means for guiding the welding wire in a straight line and for supplying the electric current, and also comprises a wire straightening roller assembly which is connected to the welding head, and a feeder for supplying the welding powder. Narrow gap submerged arc welding is employed at a growing rate for joining thick-walled steel structure elements, particularly in the construction of pressure vessels in nuclear reactors.

The invention is directed to a further development of prior art equipment of this kind, making it possible to weld parts with even thicker walls than hitherto. That is, with the increasing requirement on safety and larger capacities as well as higher pressures of the units, the walls of the vessels, especially of nuclear reactors, become thicker and may reach a thickness of 1,000 mm and even more. Experience has shown that with such extreme wall thicknesses, prior art welding wire feeding equipments no longer satisfy the need. Very high requirements must be placed on the quality and accuracy of location of the weld beads in the narrow gap, to obtain a faultless joint. The thicker the material is, the longer must be the welding head comprising the wire feed blade and the current conducting blade. At the same time, for reasons of economy and metallurgical technology, it is sought not to enlarge the gap, on the contrary, the gap should be narrower if possible, to reduce the zone of welding and thus the welding time. This imposes highest requirements on the geometrical accuracy of the welding wire feed and, consequently, also on the dimensional stability of the blades of the welding head. The requirements on the rigidity of these blades are particularly high if the welding wire supplied thereto is not entirely straight and exerts on the blades a bending force acting transversely to the welding direction and tending to spread the blades apart with the result of affecting their function as guides.

SUMMARY OF THE INVENTION

The invention is therefore directed to a wire feeding element making it possible to form welding beads with the highest geometrical accuracy even between bodies having extremely thick walls, of 1,000 mm or more, to obtain faultless, high-quality welded joints.

Another objective of the invention is to increase the reliability in operation of the welding head by eliminating disturbances such as flash-overs of the arc, undercuts, underscouring of flanks, etc., since in submerged narrow-gap welding of thick walls, repairing of faults is much more difficult than in conventional instances of submerged welding where the joint is more open and well accessible.

With these objectives in view, the invention is directed to an exact straightening of the welding wire supplied into the welding head, in order to eliminate substantial contact pressures on the wire guides and thus binding forces on the blades of the welding head, which would be exerted by an unsatisfactorily straightened wire and also result in an increased friction and thus wear, and further to a welding head reliable in operation, i.e. of a design rendering the wire guiding elements and the parts carrying current to the wire more stable, which also substantially contributes to the accuracy of the obtained weld head.

In accordance with the invention a device for feeding welding wire in a welding advance direction in a welding operation in which there is a narrow gap between workpieces which are to be welded together comprises a guide support having a plurality of spaced apart welding wire straightening roller assemblies mounted on it, the rollers of each assembly being located at a selected angle around and in engagement with the welding wire for feeding welding wire in a guide path defined between the rollers of each assembly. A welding head is carried on the support and it includes a welding wire guide and a current carrying guide which defines tongs which are movable relatively toward each other. The tongs include a plurality of guide shoes associated therewith which define a continuing guide path for the welding wire received from the welding wire feed guide and delivered to the welding zone between the workpieces. The current carrying guide includes a contact piece for feeding the welding current to the wire. The construction advantageously includes means for feeding welding powder into the gap between the workpieces at the location of the progressing weld.

In view of the very long welding head projecting into the narrow gap, the invention is aimed at an elimination as far as possible of any bending moments which could effect the welding head. It must therefore be insured that the supplied welding wire is exactly straightened and, further, that it is fed through the several guide shoes so as to advance also in a straight line. To avoid the effect of clamping, and preserve an unaffected guide function of the wire guiding shoes over the entire feed path, as well as to make possible a parallel adjustment compensating for wear, the current-carrying blade is designed, in accordance with the invention, as a part which is displaceable parallel, i.e., in translatory motion, toward or away from the wire guiding blade.

The straightening roller assembly advantageously comprises at least three sets of roller assemblies which may be selectively positioned at an angle relative to the wire in which they engage which are mounted on the support of the welding machine. The welding head including the tongs defined by the welding wire guide and the current carrying guide are supported on a pivot within the support member.

Further advantageous features of the invention relate to details of the straightening roller assembly and include the provisions that each straightening roller unit comprises at least two straightening rollers fixedly mounted at spaced apart locations, and at least one opposite straightening roller mounted intermediate the fixed rollers on a pivotable arm which is adjustable by means of a setting mechanism and is pressed into contact with the setting mechanism by a spring force acting to urge the roller away from the wire, and further that the adjustable pivotable arm carrying the opposite straightening roller is mounted in a fork and is adjustable by means of a manually settable threaded pin, and that the projecting lever arm end is acted upon by a compression spring by which the pivotal arm is permanently pressed against the threaded pin.

The roller housings for the guiding and straightening rollers comprises a substantially tubular shell which is designed with an upper inside recess and with a lower centering extension which is snugly fitted into the recess of the following roller housing. The extension is provided with an outer circular groove and it can be clamped in position by means of fixing screws which are supported in the shell and distributed around the circumference.

The mobility of the current-carrying blade in parallel to the other blade has the advantage that the contact piece for supplying the current is also applied to the welding wire in parallel.

At least two spaced apart guide shoes are provided on the tongs which guide the welding wire after it has been passed through the guiding and straightening rollers. At least one centering guide shoe is provided with a groove into which a tongue from the current carrying guide is engaged. Due to this tongue and groove guide, the two blades are better engaged with each other in their lower portions and thus prevented from becoming misaligned laterally.

At the lower end of the welding head 20 the wire guiding blade is provided with a wear resistant and electrically insulating slider which acts as an abutment for the welding wire. The welding wire is guided in a groove conformable to the diameter of the wire and an exchangeable contact piece of electrically conducting material preferably a copper alloy is provided on the current carrying blade which moves parallel to the guide blade of the tongs forming the head. Into this provision the welding head is prevented from sliding against the walls bounding the welding gap which might disturb the welding operation.

The thickness of the blades forming the guide blade and the current-carrying tongue decreases continuously in a direction away from the sliding and bending rollers. The available space can thus be utilized for a statical reinforcement of the welding head by increasing the thickness thereof which is of importance in view of the length of the head.

The blades which define the welding head are provided with channels for circulating a coolant therethrough. This makes it possible that the temperature of the blades are maintained below 100° so that dimensional changes due to varying temperatures can be prevented. This cooling of the blades of the welding head which may be affected by any fluid has a further advantage that the shoes for guiding the welding wire which are made of an insulating material can also be kept cool. Most blades are advantageously made of a nonmagnetic conducting material preferably a coppy alloy.

The current carrying blade is movable in parallel to the wire guiding blade and is slidably guided on mutually parallel guide rods which are mounted in the support perpendicular to the welding wire axis.

The contact pressure between the current carrying guide and the welding wire guide is adjustable in order to obtain a satisfactory current transferring contact between the contact piece and the welding wire without unduly increasing the friction between the wire and the current contact piece. The contact pressure can be determined by means of an incorporated pressure pickup and read on an indicator provided with the invention.

Because of the pressure exerted by the current-carrying blade, the abrasion of the groove for guiding the welding wire in the contact piece leads to a gradual parallel displacement of the movable blade in the direction of the fixed wire guiding blade. Since it is advantageous to know this abrasion per unit of time or for a period of wire passage in order to appreciate the suitability of the employed materials and also to be able to replace the contact piece at the proper time, the invention provides that an indicator for indicating the relative displacement between the fixed blade and the movable blade is provided on the wire guiding blade or on the carrying member.

The tongs forming the welding head are advantageously pivotable about a single hinge bolt in both directions perpendicular to the welding direction in order to make it possible to deposit the weld beads at the walls bounding the narrow gap between the workpieces. For this purpose a bore is provided at the end portion which is remote from the wire guiding zone of the carrying member of the welding head and a control spindle extends through this bore and it is displaceable transversely and equipped with engaging elements which are applied against the carrying member. A control spindle is provided with a coarse thread sleeve which can be displaced by rotary motion in a threaded bushing in both directions of rotation in order to effect a pivotal motion of the welding head carrying member by means of the engaging elements.

It is advantageous in accordance with a further development of the invention that the nut with the coarse thread in which the control spindle turns is made adjustable in a crosswise direction so as to permit an exact adjustment of the welding head to the center. For this purpose the threaded bushing is fixably received in a setting sleeve which is mounted on a supporting case for adjustment by transversal displacement.

The inventive control spindle may be displaced manually or mechanically to obtain an arrangement in which upon every deposition of a weld bead, the head is pivoted into a mid position or into the opposite pivotal position, depending on whether the narrow gap is welded with one, two, three or more beads.

With the invention a control spindle is rotatable by turning a handle secured to the bolt which may be displaced from a middle position in either direction. The control spindle is provided with a recess into which a spring bias latch pin extends in the mid position to detachably lock the spindle in this mid position. Engaging elements are designed as slip rings of a suitable material which are loosely fitted on the control spindle and biased by helical springs. This means that a certain resilience is provided between the elements causing the displacement of the control spindle and the carrying member of the welding head in order to allow variations which may occur in the width of the welded gap and to insure accurate deposition of the weld beads at the gap boundaries independently of the instantaneous width of this gap.

This design makes it possible in addition to maintain the desired spacing of the welding wire from the respective walls of the gap, by selecting the diameter, which is determining in this respect, of the guide rollers carried by the welding head. The maximum pivotal angle of the welding head will be set to a value slightly in excess of that needed for obtaining a minimum distance from the walls of the gap to be welded. The rollers thus will always come into, and remain in, contact with the wall so that, due to the spring pressure, an exact guidance of the welding head along the walls at a constant distance therefrom will be obtained even with the occurrence of irregularities in the respective surfaces. This arrangement and setting of the pivotal angle thus results in an accurate laying of individual weld beads in the best possible way with highest reliability in operation.

Accordingly, it is an object of the invention to provide a device for feeding welding wire in a welding advance direction in a welding operation in which there is a narrow gap between the workpieces which are to be welded together which comprises a guide support having a housing portion with a plurality of spaced apart welding wire straightening roller assemblies which may be adjustably positioned around the welding wire and which define a feed gap guide path for the passage of the welding wire between the rollers of each assembly and which also includes a welding head made up of a current carrying guide and a welding wire guide which together define tongs of th head mounted on the support for pivotal movement toward and away from each other which carry a plurality of guide shoes which define a continuing guide path for the welding wire received from the welding wire feed guide path and deliver it to the welding zone between the workpieces. A contact piece is associated with the current carrying guide for feeding welding current to the wire, and this guide is biased in the direction toward the welding wire guide.

A further object of the invention is to provide a device for feeding welding wire which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a partly sectional detached view of the upper part of the device;

FIG. 3 shows the lower part of the device, partly in section;

FIG. 4 is a section taken along the line IV—IV of FIG. 2;

FIG. 5 is a vertical sectional view taken along the axis of the control spindle;

FIG. 6 is an elevation showing the welding head in operating position within the narrow gap;

FIG. 7 is a detail indicated E in FIG. 3;

FIG. 8 is a detail indicated D in FIG. 3;

DESCRIPTION OF THE PREFERRED EMBODIMENT

Figure 1:
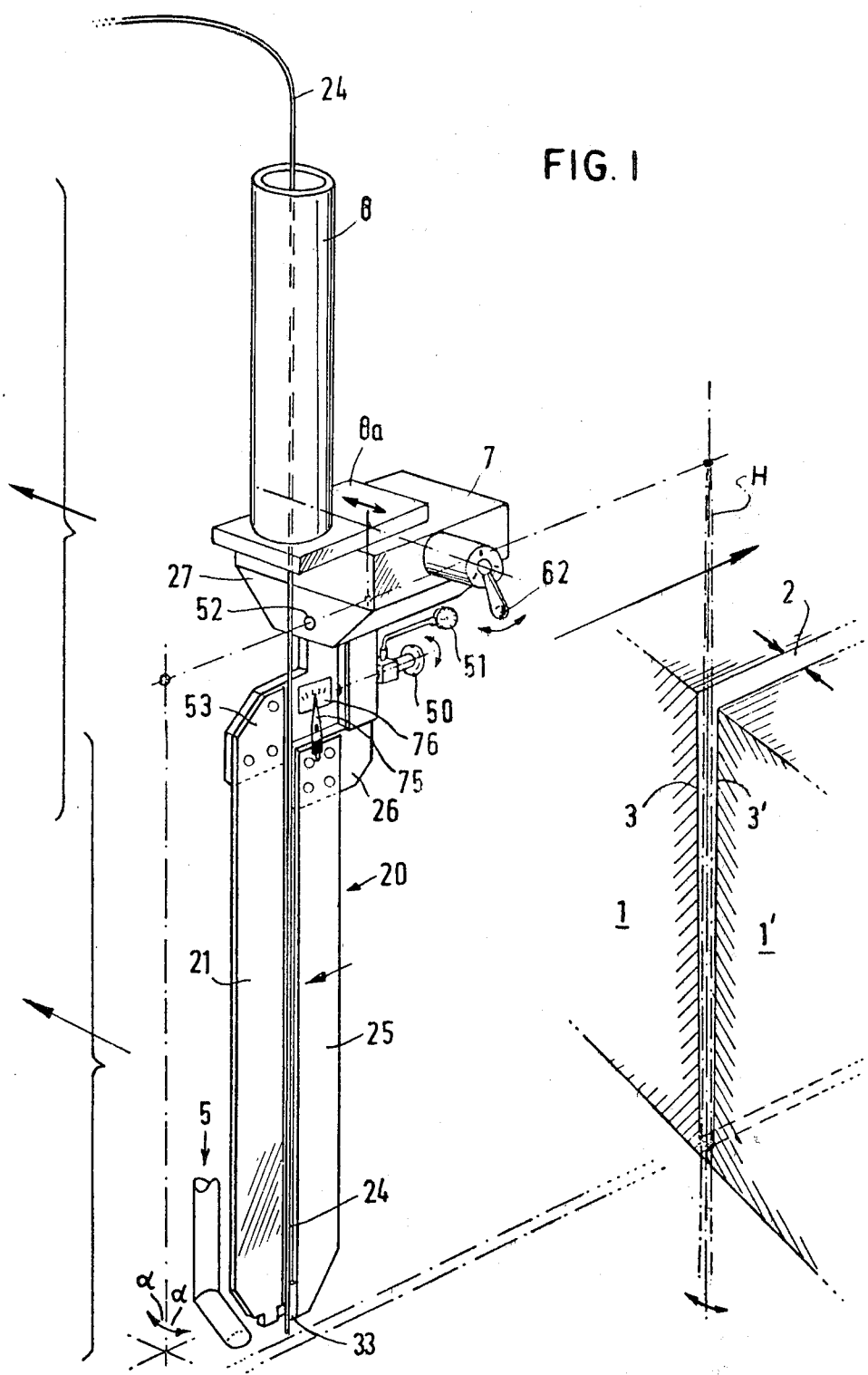
FIG. 1 is a perspective view of a welding device constructed in accordance with the invention showing only its substantial elements as used for welding in a narrow gap.
Figure 9:
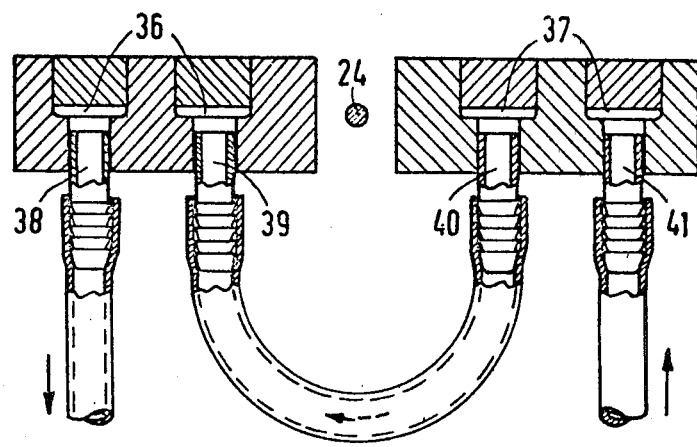
FIG. 9 is a section along the line III—III of FIG. 3.
Figure 10:
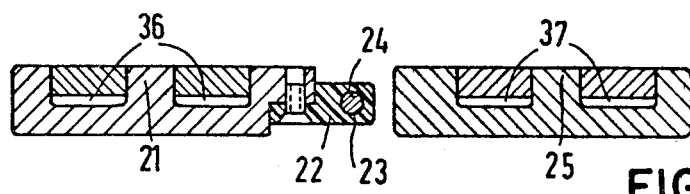
FIG. 10 is a section along the line IV—IV of FIG. 3.
Figure 11:
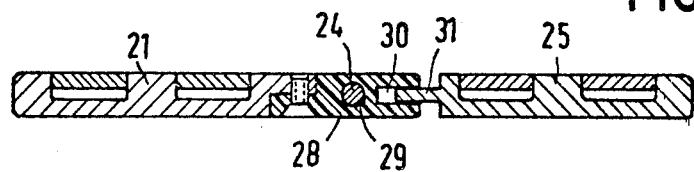
FIG. 11 is a section along the line V—V of FIG. 3.
Figure 12:
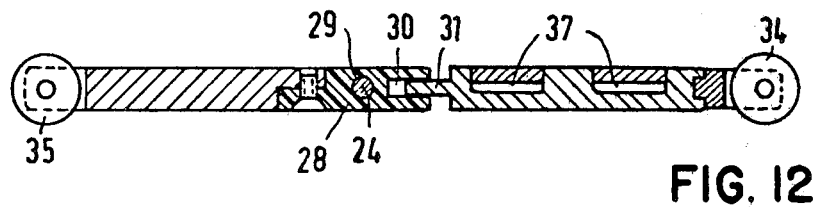
FIG. 12 is a section along the line VI—VI of FIG. 3.
Figure 13:
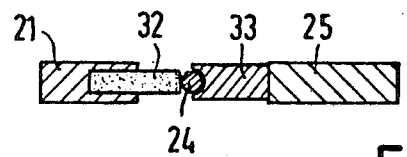
FIG. 13 is a section along the line VII—VII of FIG. 3.

Referring to the drawings in particular the invention embodied therein comprises a device for feeding welding wire in a welding advance direction in a welding operation in which there is a narrow gap between the workpieces 1 and 1' as indicated at 2 in FIG. 1. The workpieces 1 and 1' which may, for example be a single workpiece or made up of a plurality of workpieces include surfaces 3 and 3' which are substantially parallel. A device of the invention includes the supporting member or case 7 having a roller assembly 8 fixed thereon by a lug 8a with a plurality of spaced apart welding wire straightening rollers shown at 10 and 11 in FIG. 2. Each of the welding roller assemblies 10 and 11 are positionable at selected angles around and in engagement with a welding wire 24 and they define a feed guide path for the passage of the welding wire between the rollers of each assembly. In addition the invention includes a welding head 20 made up of a welding wire guide 21 and a current carrying guide 25 which define tongs of the head mounted in the support 7 for pivotal movement toward and away from each other. The welding head includes a plurality of guide shoes associated with the tongs which define a continuous guide for the welding wire received from the welding wire feed guide path and delivered by the tongs to the welding zone between the workpieces. A contact piece 33 shown in FIG. 3 is associated with the current carrying guide 25 in order to supply a welding current to the wire at the weld zone location. Means are provided such as a helical spring 44 shown in FIG. 2 to bias the current carrying guide 25 toward the wire guide 21.

The perspective view of FIG. 1 shows the device with its substantial component parts in relation to the narrow gap joint to be welded. The dash-dotted double lines indicate the travel of a welding head 20 into gap 2 which is bounded by substantially parallel wall surfaces 3, and the extension of the welding head in the gap in which weld beads are to be deposited from the bottom upwardly, as illustrated in FIG. 6 by the first three beads A,B,C.

The device comprises the supporting case 7 mounted on a machine support (not shown) which is movable to produce weld beads in the longitudinal direction of gap 2. The straightening roller assembly 8 is secured to case 7 by means of lug 8a, and welding head 20 carrying the guide elements for the welding wire 24 is secured thereto by means of a hinge bolt 52 which is supported by side walls 27 of case 7 (FIG. 2).

The welding head comprises the fixed wire guiding blade 21 and the movable current-carrying blade 25 which latter is displaceable in parallel, i.e, in translatory motion, toward or away from blade 21, as well as further equipment described hereafter, and the feeder 5 for the welding powder which is only indicated schematically.

Case 7 carries a setting handle 62 for pivoting welding head 20 transversely to the traveling direction of the device, and head 20 carries means 44 to 50 for adjusting the tension of a spring acting on blade 25, and an indicator 51 therefor.

The details of roller assembly 8 for straightening the welding wire 24 may be learned from FIGS. 2 and 4. The mechanism comprises five straightening roller units, of which the two lowermost ones 10, 11 are shown in section. The roller units are in positions, for example, turned relative to one another through an angle such as 90°. Any other positions of the units relative to each other may be provided, however, to obtain the desired straightening effect. Each unit accommodates two straightening rollers 12 which are fixedly mounted in spaced apart positions, and an opposite straightening roller 13 which is provided intermediate the two rollers 12 and mounted on an adjustable pivotal arm 14. Pivotal arm 14 is pivoted in a fork 16 and can be set by means of a threaded pin 17 and a knob 18. This makes possible to finely adjust any of the opposite rollers 13. Upon loosening threaded pin 17, a spring 15 pushes arm 14 to disengage roller 13 from the wire, so that the wire can easily be introduced.

Each straightening roller unit 10, 11 includes a cylindrical housing 9 comprising a shell 9a. Shell 9a is provided with a circumferential recess 9b at the top into which a centering extension 9c of the adjacent shell is snugly fitted. Extension 9c is provided with a circular groove for fixing screws 9d which are circumferentially distributed and supported in shell 9c.

By means of lug 8a, straightening roller assembly 8 is screwed to supporting case 7. Hinge bolt 52 is fixed in the side walls 27 of case 7, and a carrying member 53 of welding head 20 is pivotable thereabout through angle α.

Details of this pivotal arrangement are shown in FIG. 5. Carrying member 53 is provided in its upper end portion 54 with a bore 63 through which a control spindle 55 is passed. On one of its end, control spindle 55 carries a coarse-thread sleeve 57 which along with the spindle, is displaceable by rotary motion in a threaded bushing or nut 58, in both directions. Control spindle 55 carries adjustable abutment elements 69, 70 for helical springs 67, 68, with the abutment elements being fixably positioned by means of lock nuts 71, 72, and spring 67,68 being applied against engaging rings 56 which are made of a sliding material and loosely fitted on control spindle 55 and are pressed by the springs into contact with the side surfaces of carrying member 53, 54. Due to this arrangement, upon displacing spindle 55, carrying member 53,54, and thus welding head 20 secured thereto, are resiliently taken along in pivotal motion and guide rollers 34,35 of welding head 20 apply against one or the other of boundary walls 3 of welding gap 2 already prior to reaching the maximum of the provided pivotal angle of the welding head.

In the mid position of control spindle 55, carrying member 54 is non-positively locked thereto by a spring loaded latch pin 66 which is provided in member 54 adjacent bore 63 and engages a recess 64 of spindle 55. The mid position of spindle 55 can thus be set exactly. To be able to adjust the entire device with spindle 55 in its mid position, nut 58 with the coarse internal thread is displaceable in a sleeve 57 of case 7, and can be fixed in its position therein. For this purpose, nut 58 is provided with an oblong groove 78 into which a threaded pin 79 fixed by a lock nut 80 is engaged.

Welding head 20 is pivoted by means of setting handle 62 which is firmly fitted to a rotary, but axially fixed, bolt 61 through which turning of the handle is transmitted, by means of a pin 60 engaging a groove 59, to threaded sleeve 57 and control spindle 55.

The design of wire guiding blade 21 and current carrying blade 25 is shown in FIGS. 3 and 6–13. The fixed wire guiding blade 21 is secured to carrying member 53. At spaced apart locations, blade 21 is provided with guide shoes 22,23 (see also FIG. 10) for the welding wire 24. In the lower portion of blade 21, the wire is guided by shoe 28, 29 and, in addition, by a groove 30 which is engaged on a tongue 31 forming a part of current carrying blade 25 (see FIG. 11). At this location, blade 21 must be electrically insulated from blade 25. To this end, guide shoe 28, 29 is made of a non-conducting material.

In the still lower portion of both blades 21,25 the guide rollers 34, 35 are provided which are exchangeable and mounted in bearings 81,82. By choosing a proper diameter of the rollers, a predetermined distance of welding head 20 from the boundary walls 3 in welding gap 2 is maintained. Depending on the requirements, guide rollers 34, 35 may be provided close to the lower end of welding head 20, for depositing beads in the upper portion of the gap (see FIGS. 7 and 8), or at a higher level, for depositing deep in the gap (see FIG. 3).

For its motion parallel to blade 21, current carrying blade 25 is slidably guided by its headpiece 26 on guide rods 42, 43 which are secured in the side walls of carrying member 53 hinged to bolt 52. The spring force urging blade 25 against blade 21 is produced by a helical spring 44 bearing against an adjustable thrust bushing 46, and against an abutment 48 provided in headpiece 26 of blade 25. Thrust bushing 46 is displaceable by turning an ajusting screw 47 in carrying member 53, through a knob 50. A pressure pickup (not shown) incorporated in thrust bushing 46 acts on an indicator 51 through a connection 49.

As shown in FIGS. 3 and 9–12, blades 21 and 25 are provided with channels 36,37 for circulating a coolant therethrough, and with corresponding connections 38, 39, 40, 41 for flexible tubes through which the coolant is supplied and discharged. At the lower end of welding head 20, means for the final feeding of welding wire 24 and supplying current thereto are provided. They comprise a wear resistant, insulated slider 32 which is exchangeably mounted in the zone of the lower end of fixed wire guiding blade 21. Welding wire 24 is pressed into contact with this slider 32 by means of a contact piece 33(see FIG. 13). Contact piece 23 is provided with a guide groove conformable to the diameter of the welding wire and is made of a copper alloy resistant to abrasion. The contact piece 23 is screwed to the blade 25 and can easily be changed upon wearing down. The current abrasion of the contact piece is compensated for by continually adjusting blade 25 which is spring loaded. The amount of adjustment is indicated by an indicator 75,76 where the relative displacement between the fixed and the movable blades 21, 25 can be read.

The particular design of the straightening roller assembly makes it possible to exactly straighten the welding wire supplied from the reel, and to feed it without disturbances to the lower end of the welding head. Below the straightening roller assembly, the wire is guided by an additional guide shoe 6. Experience has shown that the very slight curving of the wire between guide shoe 6 and the uppermost guide shoes 22, 23, caused by the slight pivoting of welding head 20 does not affect the correct operation of the welding head. Due to the inventive design of welding head 20 and the auxiliary equipment, deformations are minimized. Other advantages are the suitable shape, the provided cooling, and also the mutual guidance of the two blades 21, 25 by positive engagement. The concurrent effect of these particular features of the device results in an exact guidance of the welding head and in a maximum precision and accuracy in depositing the weld beads in the narrow gap, which is most appreciable primarily if extremely thick walls with deep joint gaps are to be welded. While a specific embodiment of the invention has been shown and described in detail to illustrate the application of the principles of the invention, it will be understood that the invention may be embodied otherwise without departing from such principles.

What is claimed is:

1. A device for feeding welding wire in a welding advance direction in a welding operation in which there is a narrow gap between welding workpieces which are to be welded together, comprising: a guide support; a plurality of spaced apart wire straightening roller assemblies mounted on said guide support, said straightening roller assemblies being positioned at separated location and at selected angles around the circumference and in engagement with the welding wire and defining a feed guide path for the passage of a welding wire, said welding wire straightening roller assemblies comprise at least three separate units arranged in spaced relationship along the feed guide path, each unit being positioned at a desired angle around the periphery of the welding wire with respect to an adjacent unit, each of said units comprising a shell which is centered and fixed with respect to a shell of an adjacent unit, at least two straightening rollers rotatably mounted to said shell on one side of the feed guide path and at least one other straightening roller rotatably mounted to said shell on an opposite side of the feed path for straightening the welding wire therebetween; a carrying member mounted for pivotal motion on said guide support; a welding head mounted on said carrying member including a current-carrying guide and a welding wire guide arranged in spaced opposition and defining tongs of said head; means on said carrying member for mounting said current-carrying guide and said welding wire guide for movement toward and away from each other; a plurality of guide shoes associated with said tongs defining a continuing guide for the welding wire aligned with the feed guide path and receiving wire from the feed guide path and advancing it to the welding zone between the workpieces; a contact piece associated with said current carrying guide for delivering welding current to the wire at a welding zone; and means for biasing said current-carrying guide toward said welding wire guide.

2. A device according to claim 1 wherein each shell comprises a cylindrical roller housing accommodating said straightening rollers.

3. A device according to claim 2, wherein each roller housing comprises an upper inside recess and a lower centering extension with the lower extension of one fitting into the recess of the next adajcent one, said extension being provided with an outer circular groove which can be clamped in position, and fixing screw means clamping said extension into position relative to the next adjacent housing portion.

4. A device according to claim 1, wherein said wire guide of said welding head includes at least two spaced apart guide shoes having means for guiding the welding wire and at least one centering guide shoe provided with a groove, said current-carrying guide having a tongue engageable in the groove of said welding wire guide.

5. A device according to claim 1, wherein said wire guide has a wear-resistant and electrically insulating slider adjacent its lower end acting as an abutment for the welding wire, said contact piece defining a groove for the welding wire conformable to the diameter of the welding wire, being of electrically conducting material and being exchangeable.

6. A device according to claim 1, wherein said tongs include a plurality of rotatable and exchangeable guide rollers and electrically insulating support means on said tongs for mounting said guide rollers for gap movement.

7. A device according to claim 1, wherein said welding wire guide and said current-carrying guide comprises blade elements decreasing in thickness continuously in a direction away from said guide path.

8. A device according to claim 1, wherein said welding wire guide and said current-carrying guide comprises blade elements, and channel means in said blade elements defining means for circulating a coolant therethrough.

9. A device according to claim 1, wherein said tongs comprise blade members made of a non-magnetic material with good heat and electrical conducting properties.

10. A device according to claim 1, characterized in that a bore (63) is provided in an end portion (54) remote from the wire guiding zone of the carrying member (53) of the welding head (20), and that a control spindle (55) extends through this bore (63) and is displaceable transversely and equipped with engaging elements (56) which are applied against the carrying member (53).

11. A device according to claim 10, characterized in that on one of its ends, the control spindle (55) is provided with a coarse-thread sleeve (57) which can be displaced by rotary motion in a threaded bushing (58) in both directions of rotation, to effect a pivotable motion of the welding head-carrying member (53) by means of the engaging elements (55).

12. A device according to claim 10, characterized in that the threaded bushing (58) is fixably received in a setting sleeve (77) which is mounted in the guide support (7) for adjustment by transversal displacement.

13. A device according to claim 10, characterized in that at its threaded end portion and through a bolt-groove guidance (59,60) and a bolt (61) which is rotable but axially fixed, the control spindle (55) is rotatable by turning a handle (62) secured to the bolt (61), to be displaced from a middle position in either direction.

14. A device according to claim 13, characterized in that in its portion within the bore (63) of the carrying member (53), the control spindle (55) is provided with a recess (64) into which, with the spindle in mid position, a spring biased latch pin (66) is non-positively engaged, to detachably lock the spindle (55) and the carrying member 53 to each other in this mid position.

15. A device according to claim 1, wherein said current-carrying guide and said welding wire guide comprise substantially parallel blade members, a pair of guide rods carried on said carrying member for slidably carrying said current-carrying guide.

16. A device according to claim 1, including means for adjusting said biasing means and a pressure pickup associated with said adjusting means for indicating a contact pressure between said current-carrying guide and said welding wire guide.

17. A device according to claim 16, wherein said current-carrying guide and said welding wire guide comprise substantially parallel blade members lying in a common plane and having outer edges spaced away from the feed guide path for the welding wire, and at least one guide roller on each of said edges adjacent lower ends of said current-carrying and welding wire guide remote from said carrying member, for guiding said tongs in the narrow gap between the welding workpieces.

18. A device according to claim 17, including means for pivotally mounting said tongs in a direction normal to said common plane with respect to said guide support, said means for pivotally mounting comprising said carrying member having an upper portion with a bore therethrough, a bolt connected to said guide support and extending through said bore for pivotally mounting said upper portion of said carrying member and rotatable spindle means rotatably mounted to said support above said bolt and engaged with said upper portion for pivoting said carrying member and tongs.

19. A device according to claim 16, including indicator means for indicating the movement of said current-carrying guide relative to said welding wire guide.

20. A device according to claim 10, characterized in that slip rings (56) are loosely fitted on the control spindle and biased by helical springs (67,68) which, by their other ends, bear against abutments (69,70) which are secured to threaded portions (73,74) of the control spindle (55) by means of lock nuts (71,72) in such a way that the desired bias of the springs is adjustable.

* * * * *